Figure 1:
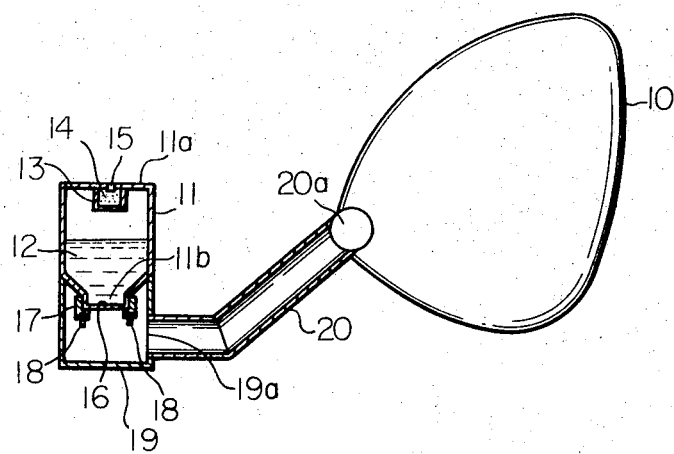

United States Patent
Matsui et al.

[15] 3,687,486
[45] Aug. 29, 1972

[54] AUTOMOTIVE SAFETY DEVICE HAVING INFLATABLE CONFINEMENT

[72] Inventors: Shunji Matsui, 3065, Tomioka-cho, Kanazawa-ku, Yokohama; Yosikazu Hayakawa, 368, Oppama-higashi-cho, Yokohama; Kenzo Hirashima, 714, Nishiterao, Kanagawa-ku, Yokohama, all of Japan

[22] Filed: March 8, 1971

[21] Appl. No.: 121,639

[30] Foreign Application Priority Data

Sept. 8, 1970 Japan ..................... 45/78728

[52] U.S. Cl. .................... 280/150 AB, 9/316, 222/3
[51] Int. Cl. ............................................. B60r 21/06
[58] Field of Search ....... 280/150 AB; 180/82; 9/316; 222/3

[56] References Cited

UNITED STATES PATENTS 3,450,414  6/1969  Kobori ................. 280/150 AB
3,618,974  11/1971  Chute ..................... 280/150

*Primary Examiner*—Kenneth H. Betts
*Attorney*—Robert E. Burns and Emmanuel J. Lobato

[57] ABSTRACT

An automotive safety device for protecting a vehicle occupant from injury during collision of the vehicle with an obstruction, having an inflatable, normally contracted confinement and a container for storing a source of working media to be converted into pressurized fluid for expanding the confinement, wherein an outlet opening for discharging the pressurized fluid from the container is formed at the lower end of the container and an igniting means for firing an explosive to explosively expand the source of working media into pressurized fluid is positioned at the upper end of the container. The safety device features increased velocity of the flow of the pressurized fluid to the confinement and a reduced noise produced by the blasting of the explosive in the container.

3 Claims, 2 Drawing Figures

AUTOMOTIVE SAFETY DEVICE HAVING INFLATABLE CONFINEMENT

This invention relates to an automotive safety device and, more particularly, to a safety device which is adapted to protect a vehicle occupant from being forcefully thrown against structural parts of the vehicle such as the steering wheel, instrument panel and/or windshield.

The safety device to which this invention is directed generally includes an inflatable or expandible confinement which is usually in a contracted or folded condition and a container of a source of working fluid under pressure, such as Fluorinated, for actuating the confinement to its expanded condition during a collision of the motor vehicle with an obstruction. The operating condition of the vehicle as encountered at the initial stage of the collision is detected by suitable sensing means and the fluid under pressure is caused to rush into the contracted confinement through firing of suitable explosive means. The confinement is consequently expanded and caused to project between the occupant and the structural parts of the vehicle, whereby the occupant is protected from injury.

An object of this invention is to provide an automotive safety device of the above outlined character, in which a fluid under pressure is drawn into an inflatable confinement immediately when or even simultaneously as a collision is encountered by the motor vehicle during cruising.

Another object of this invention is to provide a vehicular safety device in which not only the pressurized fluid is rushed into the confinement instantaneously during a collision but the detonating sound produced by the blasting of an explosive and a noise concomitant with the expansion of the source of a working media can be alleviated significantly.

Figure 2:
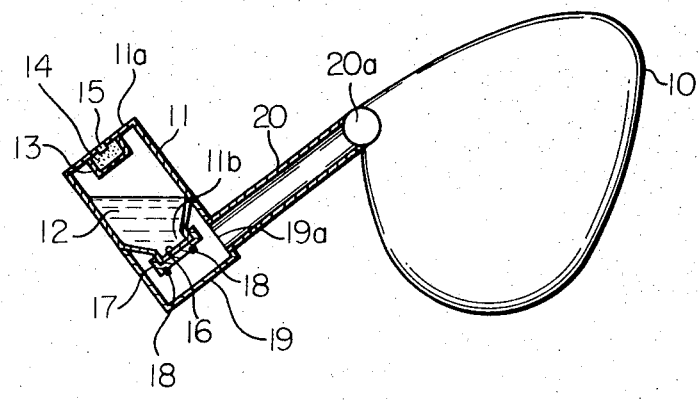

In the drawings:

FIG. 1 is a sectional view showing a preferred embodiment of the device according to this invention; and FIG. 2 is similar to FIG. 1 but shows another preferred embodiment of the device according to this invention.

Reference is first made to FIG. 1, wherein the device according to this invention has an inflatable or expandible confinement 10 which is normally in a contracted or folded position. The shown device includes a container 11 in which a source 12 of working media such as Freon (R.T.M.) is stored. The container is closed at its upper end with an end wall 11a and opened at its lower end to form an opening 11b facing downward. The container 11 is herein shown as reduced toward its bottom end and held in an upright position relative to the vehicle body (not shown). A cartridge 13 loaded with an explosive 14 is attached to the inner surface of the end wall 11a of the container 11. An igniting means or squib 15 extends through the end wall 11a of the container 11, slightly protruding into the explosive 14 in the cartridge 13. The cartridge 13 is thus positioned over the surface of the source 12 of working media.

The igniting means or squib 15 is connected to suitable sensing means (not shown) for sensing an impact between the motor vehicle and an obstruction and, when such impact is detected by the sensing means, a signal is applied to the igniting means or squib 15 so that the igniting means or squib is caused to fire.

To the lower peripheral end of the container 11 is detachably attached a sealing plate 16 by which the opening 11b is closed. The sealing plate 16 is secured to the container 11 by means of a retainer 17 which is centrally apertured. A detonating means 18 is mounted on the outer side of the retainer 17, which detonating means is connected to the aforesaid sensing means and caused to fire when an impact between the vehicle and an obstruction is sensed thereby.

A housing 19 is mounted on the container 11, enclosing the lower end of the container as illustrated. The housing 19 has an outlet 19a, from which a diffuser tube 20 leads into the confinement 10 through a diffuser outlet 20a.

When, now, an impact is encountered by the motor vehicle then the sensing means detects the impact and causes both the igniting means 15 and the detonating means 18 to fire simultaneously. By the firing of the detonating means 18, the retainer 17 which has secured the sealing plate 16 to the container 11 is broken so that the sealing plate 16 is immediately released from the container 11. Slightly after or simultaneously as the sealing plate 16 is removed from the container 11, the heat resulting from the firing of the igniting means 15 is transferred to the explosive 14 in the cartridge 13 so that the explosive 14 is now fired, causing the source 12 of working media to expand suddenly. The fluid under pressure thus caused in the container 11 is allowed out of the container through the opening 11b formed at the lower end of the container. The pressurized fluid is then rushed into the confinement through the housing 19 and the diffuser tube 20, whereupon the confinement 10 which has been held in its contracted state is actuated to its inflated or expanded position.

Since, thus, the container 11 is positioned so that the outlet opening 11b of the pressurized fluid is positioned at its bottom end with the igniting means 15 positioned over the surface of the source 12 of the working media, the kinetic energy produced by the blasting of the explosive 14 is exerted upon the surface of the source 12 of the working media whereby the working media being allowed out of the container 11 is accelerated spontaneously. Such acceleration of the working media will be reflected by significant reduction of the time lag between the moment at which the explosive expansion of the source 12 of working media and the moment at which the pressurized fluid is admitted into the contracted confinement 10. With the igniting means or squib 15 positioned over the surface of the source 12 of the working media, moreover, the detonating sound produced by the firing of the igniting means or squib 15 is transferred to the outside through the working media and is thereby dampened in the working media. The noise concomitant with the actuation of the safety device according to this invention can be alleviated significantly, let alone the increased velocity of the pressurized fluid being passed over to the confinement 10.

The features which are above noted may be attained where the container 11 is positioned to be inclined at a certain angle insofar as the sealing plate 16 is positioned at the bottom of the source 12 of the working media and the igniting means or squib 15 is positioned over the surface of the source 12 of the working media, an example being illustrated in FIG. 2.

What is claimed is:

1. An automotive safety device for protecting a vehicle occupant from injury during a collision comprising an inflatable confinement which is normally in a contacted condition, sensing means for sensing an impact between the motor vehicle and an obstruction, and a device including a container storing therein a source of working fluid to be converted into pressurized fluid, said container having an opening formed at its lower end, an explosive stored in a cartridge mounted on an inner surface of an upper end wall of said container, igniting means extending through said upper end wall and slightly protruding into said explosive, said igniting means being connected to said sensing means detects said impact, a sealing plate detachable attached to said lower end of said container for closing said opening, an apertured retainer secured to said container for retaining said sealing plate to said container, detonating means mounted on the outer side of said retainer and connected to said sensing means for being fired when said sensing means detects said impact, and a housing enclosing the lower end portion of said container and communicating with said confinement, said explosive being fired by the firing of said igniting means for converting said source of working media into pressurized gas and said retainer being broken by the firing of said detonating means for releasing said sealing plate from said container whereby said pressurized fluid is caused to rush into said confinement through said opening and said housing for actuating the confinement to its expanded condition.

2. A device according to claim 1, wherein said container is held in an upright position relative to the vehicle body.

3. A device according to claim 1, wherein said container is inclined relative to the vehicle body.

* * * * *

UNITED STATES PATENT OFFICE
CERTIFICATE OF CORRECTION

Patent No. 3,687,486        Dated August 29, 1972

Inventor(s) SHUNJI MATSUI, YOSIKAZU HAYAKAWA & KENZO HIRASHIMA

It is certified that error appears in the above-identified patent and that said Letters Patent are hereby corrected as shown below:

In the heading, following Item [72] insert the following:

--[73] Assignee: Nissan Motor Company, Limited,
       Yokohama City, Japan
       a corporation of Japan--

Signed and sealed this 17th day of April 1973.

(SEAL)
Attest:

EDWARD M. FLETCHER, JR.            ROBERT GOTTSCHALK
Attesting Officer                  Commissioner of Patents